United States Patent [19]
Behr et al.

[11] Patent Number: 5,823,567
[45] Date of Patent: Oct. 20, 1998

[54] FOLDED INFLATABLE PROTECTIVE DEVICE AND METHOD FOR MAKING SAME

[75] Inventors: Vance L. Behr; James M. Nelsen, both of Albuquerque; Kenneth W. Gwinn, Cedar Crest, all of N. Mex.

[73] Assignees: Precision Fabrics Group, Inc., Greensboro, N.C.; Sandia Corporation, Albuquerque, N. Mex.

[21] Appl. No.: 674,817

[22] Filed: Jul. 3, 1996

[51] Int. Cl.⁶ .................................................. B60R 21/16
[52] U.S. Cl. ...................................... 280/743.1; 280/728.1
[58] Field of Search ......................... 280/728.1, 743.1; 428/36.1

[56] References Cited

U.S. PATENT DOCUMENTS

| | | | |
|---|---|---|---|
| Re. 33,938 | 5/1992 | Cuevas | 280/731 |
| 3,787,075 | 1/1974 | Francis | 280/150 |
| 3,807,754 | 4/1974 | Rodenbach et al. | 280/743 |
| 3,879,057 | 4/1975 | Kawashima et al. | 280/743 A |
| 4,235,453 | 11/1980 | Lawson et al. | 280/743 |
| 4,286,954 | 9/1981 | McArthur et al. | 493/244 |
| 4,944,529 | 7/1990 | Backhaus | 280/743 |
| 4,988,118 | 1/1991 | Good et al. | 280/743 R |
| 5,004,266 | 4/1991 | Miller et al. | 280/743 |
| 5,009,452 | 4/1991 | Miller | 280/730 |
| 5,013,064 | 5/1991 | Miller et al. | 280/730 |
| 5,022,675 | 6/1991 | Zelenak, Jr. et al. | 280/743 |
| 5,022,676 | 6/1991 | Rogerson et al. | 280/743 |
| 5,044,663 | 9/1991 | Seizert | 280/731 |
| 5,087,071 | 2/1992 | Wallner et al. | 280/743 |
| 5,096,222 | 3/1992 | Komerska et al. | 280/732 |
| 5,100,169 | 3/1992 | Goor et al. | 280/733 |
| 5,121,941 | 6/1992 | Mihm et al. | 280/732 |
| 5,140,799 | 8/1992 | Satoh | 53/429 |
| 5,162,035 | 11/1992 | Baker | 493/405 |
| 5,163,893 | 11/1992 | Hara et al. | 493/458 |

(List continued on next page.)

FOREIGN PATENT DOCUMENTS

| | | | |
|---|---|---|---|
| 0479185 | 4/1992 | European Pat. Off. | |
| 479185 | 4/1992 | European Pat. Off. | 280/743.1 |
| 0485601 | 5/1992 | European Pat. Off. | 280/743 R |
| 0485603 | 5/1992 | European Pat. Off. | 280/743 R |
| 0553542 | 8/1993 | European Pat. Off. | B60R 21/22 |
| 73.12697 | 12/1973 | France | |
| 2528636 | 1/1976 | Germany | 280/743 R |
| 2439222 | 2/1976 | Germany | B60R 21/16 |
| 52-77338 | 6/1977 | Japan | 280/743 R |
| 3010946 | 1/1991 | Japan | 280/743 R |
| 3-0136946 | 6/1991 | Japan | 280/743 R |
| 4-368251 | 12/1992 | Japan | |
| 77342 | 3/1993 | Japan | 280/743 R |
| 5-254379 | 10/1993 | Japan | |
| 6-239191 | 8/1994 | Japan | 280/743.1 |
| 2263668 | 8/1993 | United Kingdom | 280/743.1 |
| 94/18033 | 8/1994 | WIPO | 280/743.1 |

*Primary Examiner*—J. J. Swann
*Assistant Examiner*—Bridget Avery
*Attorney, Agent, or Firm*—Finnegan, Henderson, Farabow, Garrett & Dunner, L.L.P.

[57] ABSTRACT

An apparatus and method for making an inflatable protective device made of lightweight material that can withstand the initial stress from inflation and enhance radial inflation. The device includes a cushion and an inflator port. The invention further includes several stacks of folded cushion material including a combination of full-width stacks and half-width stacks: a first full-width stack defined by one or more fan folds in a first lateral half of the cushion wherein the folds are substantially centered above a first center line and are substantially over the inflator port; a second full-width stack defined by one or more fan folds in a second lateral half of the cushion wherein the folds are substantially centered above the first center line and substantially over the inflator port in the first full-width stack; a first half-width stack defined by a plurality of fan folds in the bottom of the cushion where neither edge of each fold extends substantially over the second center line; and a second half-width stack defined by a plurality of fan folds in the top of the cushion wherein neither edge of each fold extends substantially over the second center line.

9 Claims, 8 Drawing Sheets

U.S. PATENT DOCUMENTS

| | | | |
|---|---|---|---|
| 5,178,407 | 1/1993 | Kelley | 280/728 |
| 5,195,775 | 3/1993 | Komerska et al. | 280/732 |
| 5,201,541 | 4/1993 | Jones et al. | 280/731 |
| 5,215,795 | 6/1993 | Matsumoto et al. | 280/473 |
| 5,240,282 | 8/1993 | Wehner et al. | 280/728 |
| 5,275,435 | 1/1994 | Fischer | 280/743 |
| 5,277,230 | 1/1994 | Sollars, Jr. | 280/743 R |
| 5,482,317 | 1/1996 | Nelsen et al. | 280/743.1 |
| 5,533,755 | 7/1996 | Nelson et al. | 280/743 R |

FOLDED INFLATABLE PROTECTIVE DEVICE AND METHOD FOR MAKING SAME

This invention was made with support of the United States Government under Contract No. DE-AC0476DP00789, awarded by the Department of Energy. The United States Government has certain rights in the invention.

BACKGROUND OF THE INVENTION

1. Field of the Invention

The present invention relates to folded inflatable protective devices using cushions made of lightweight materials and provides an apparatus particularly useful in an airbag for protecting passengers in automotive vehicles. The present invention would also be useful for many types of transportation vehicles, as well as machinery, as a protective device that can be stored compactly. This invention is also more particularly directed toward devices in which the folding of the cushion has been optimized to withstand the initial inflation stress and heat and improve radial inflation of the cushion.

Inflatable protective devices used in passenger vehicles are a component of relatively complex systems. The main elements of these systems are: an impact sensing system, an ignition system, a propellant material, an attachment device, a system enclosure, and an inflatable protective cushion. Upon sensing an impact, the propellant is ignited causing an explosive release of gases filling the cushion to a deployed state which can absorb the impact of the forward movement of a body and dissipate its energy by rapid venting of the gas. The entire sequence of events can occur within about 30 milliseconds. In the un-deployed state, the cushion is stored in or near the steering column, the dashboard, in a door, a door column, a seat or in the back of a front seat placing the cushion in close proximity to the person it is to protect.

To provide efficient storage and adequate protection, it is advantageous to have, among other things, an inflatable protective device which has a cushion compactly stored when not deployed, a folding configuration to survive the initial highly directed inflation stresses and heat, and a folding configuration which will enhance radial inflation of the cushion.

2. Description of Related Art

Figure 1:
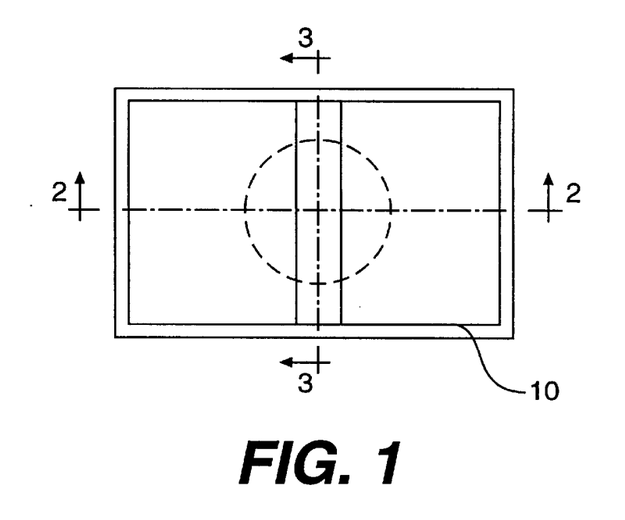
FIG. 1 is a top view of a typical pattern for folding the traditional inflatable cushion.
Figure 2:
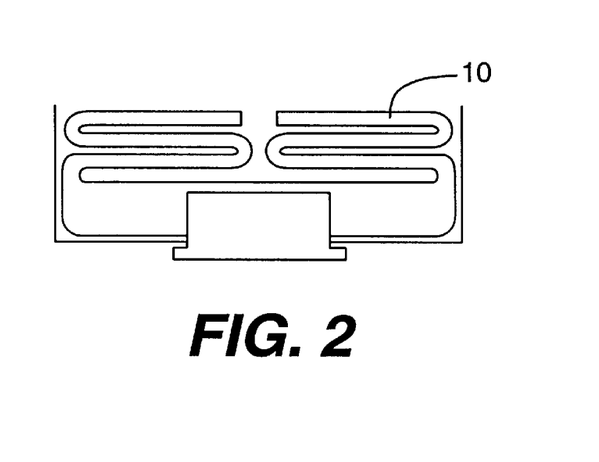
FIG. 2 is a cross-sectional view of a typical folding pattern for an inflatable cushion.
Figure 3:
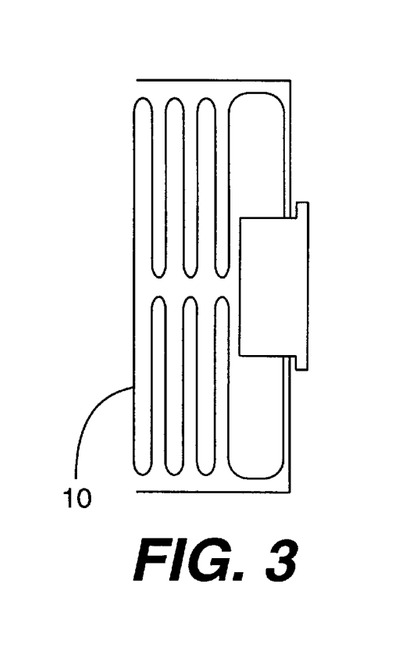
FIG. 3 is a second cross-sectional view of a typical folding pattern for an inflatable cushion.

Previously, inflatable cushions were made from coated fabrics made with heavier 420–840 denier nylon yarns. Advances in the structural design of cushions and materials used for cushions, such as those disclosed in U.S. Pat. No. 5,482,317, have enabled the use of lighter weight materials for protective cushions, including woven fabrics with less than 420 denier yarn. Because the heavier materials previously used tended to be stronger and more heat resistant, the initial explosive release of gases filling the cushion did not present the same problems as found with lightweight cushion materials. In particular, the heavier materials used generally were better able to withstand highly localized stress and heat created by the initial explosive release of gas. Accordingly, folding techniques for cushions have been most frequently directed to optimizing the compact storage with configurations that permit relatively smooth unfolding during inflation rather than how the folding configuration might assist in withstanding stress and heat from the inflator. As shown in FIGS. 1–3, a typical folding pattern for cushions made of heavier materials left only a single full-width layer of cushion material directly above the inflator port. The heavier material could usually withstand the initial stress and heat from the inflator, and thus such a folding configuration was acceptable.

SUMMARY OF THE INVENTION

The principle advantage of the present invention is the provision of a folded inflatable protective device with a cushion made of lightweight material that is folded to optimize the cushion's ability to withstand the initial inflation stresses and heat created by an inflator.

To achieve these and other advantages, and in accordance with the purpose of the invention as embodied and broadly described, the invention includes an inflatable protective device using a cushion made of lightweight material and an inflator port. The cushion is defined by a first lateral half and a second lateral half divided by a first center line and further defined by a bottom and top divided by a second center line. The inflator port is in the cushion centered on the first and second center lines. The invention further includes several stacks of folded cushion material including a combination of a full-width stack and half-width stacks that provide several layers of cushion material in front of an inflator to withstand the initial stress of inflation, but which are positioned to minimize friction between those layers during inflation.

In a preferred embodiment of the invention, the stacks include first and second full-width stacks and first and second half-width stacks of cushion material. The first full-width stack is defined by one or more fan folds in the top half wherein the folds are substantially centered above the second center line and are substantially over the inflator port. The second full-width stack is defined by one or more fan folds in the bottom half wherein the folds are substantially centered above the second center line, substantially over the inflator port, with the first full-width stack located between the second full-width stack and the inflator port. The invention additionally includes a first half-width stack defined by a plurality of fan folds in the left lateral half where neither edge of each fold extends substantially over the first center line. Finally, the second half-width stack is defined by a plurality of fan folds in the right lateral half wherein neither edge of each fold extends substantially over the first center line and the first half-width stack is located adjacent to the first half-width stack.

Additional features and advantages of the invention will be set forth in the description which follows, and in part will be apparent from the description, or may be learned by practice of the invention. The objectives and other advantages of the invention will be realized and attained by the apparatus and method of making the apparatus particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, the present invention for an inflatable protective device includes a cushion made of lightweight material and an inflator port.

Figure 4:
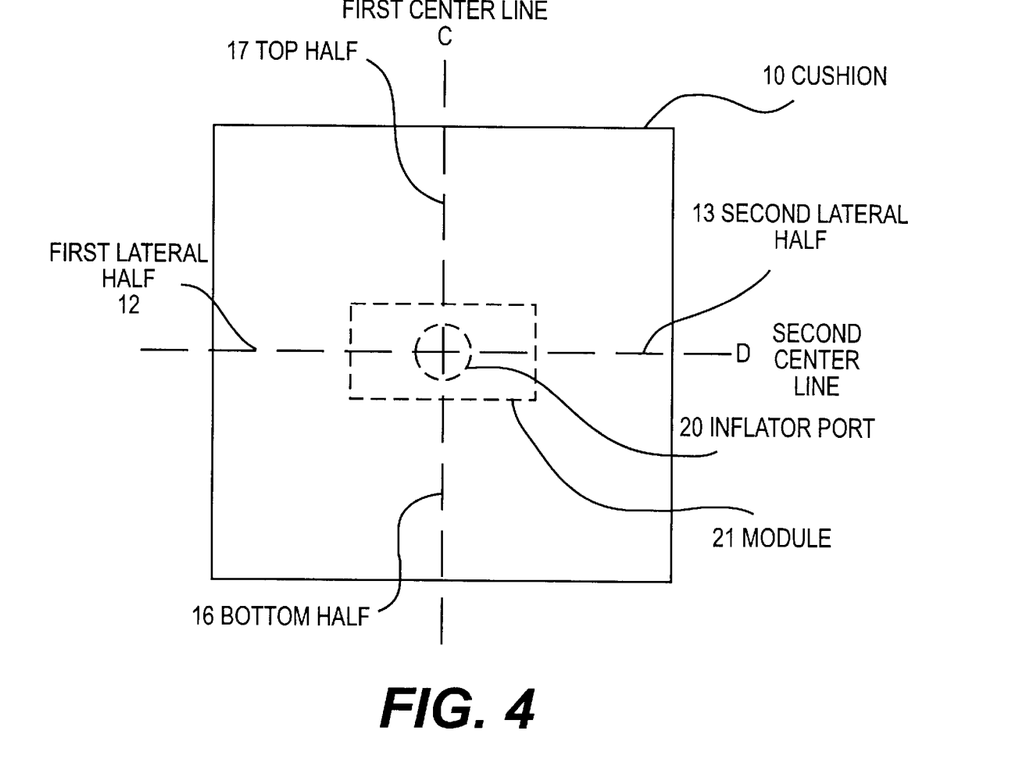
FIG. 4 is a top view of a preferred embodiment of a cushion in unfolded state.

As embodied herein and depicted in FIG. 4, cushion 10 is defined by a first lateral half 12 and a second lateral half 13 divided by a first center line C and further defined by a bottom 16 and a top 17 divided by a second center line D. One of ordinary skill in the pertinent art can provide simple folds to bring a three-dimensional cushion to a substantially flat two-dimensional cushion 10. The two-dimensional shape of cushion 10 may be of any variety, including square, rectangular, circular, elliptical, oblong, or polygonal. Cushion 10 may be made from a variety of materials including plastic, woven fibers, non-woven fibers, or a combination thereof. The cushion material may be coated with, for example, rubber or silicon, but preferably is not coated. Inflator port 20 is located on cushion 10 substantially centered on the first and second center line C and D near where an inflator would be mounted. Inflator port 20 may be any shape which will allow an inflator to discharge gases through the port into the cushion for inflation.

Figure 5:
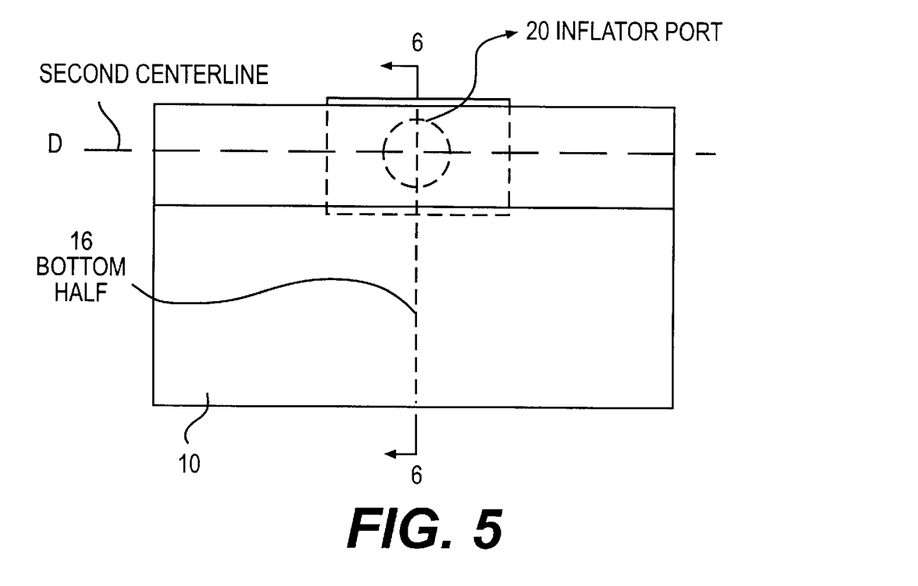
FIG. 5 is a top view of the preferred embodiment of the invention after folding cushion material to make the first full-width stack.
Figure 6:
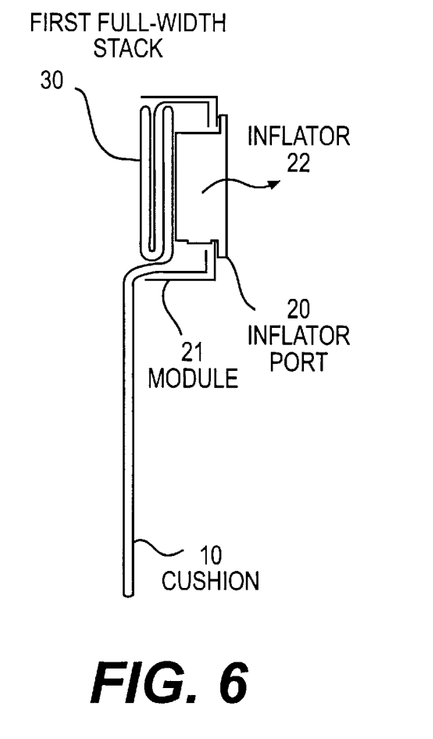
FIG. 6 is a cross-sectional view of the preferred embodiment of the invention after folding cushion material to make the first full-width stack.

As embodied herein and depicted in FIGS. 5 and 6, the preferred embodiment of the inflatable protective device further includes a first full-width stack of folded cushion material 30. For the preferred embodiment, first full-width stack 30 is defined by a one or more of fan folds in top half 17 of cushion 10 wherein the folds are substantially centered above the second center line D and the folds are substantially over inflator port 20. An advantage of stack 30 is that it places several layers of material above inflator port 20 to provide reinforcement against the initial impulse impact of inflation. The number of layers necessary to survive the initial stress and heat of inflation depends on the weight of the cushion material used. Preferably, when using a woven fabric with a denier of 100 or less, a minimum of 3–5 layers should be in first full-width stack 30. A fewer number of layers will be necessary to ensure survival of the cushion as an increasingly heavier weight or stronger material is used for the cushion and if there are other full-width layers in other stacks. It is contemplated that the number of layers may be adjusted to obtain successful survival of the cushion if an alternative lightweight cushion material or other full-width stacks are used.

Figure 7:
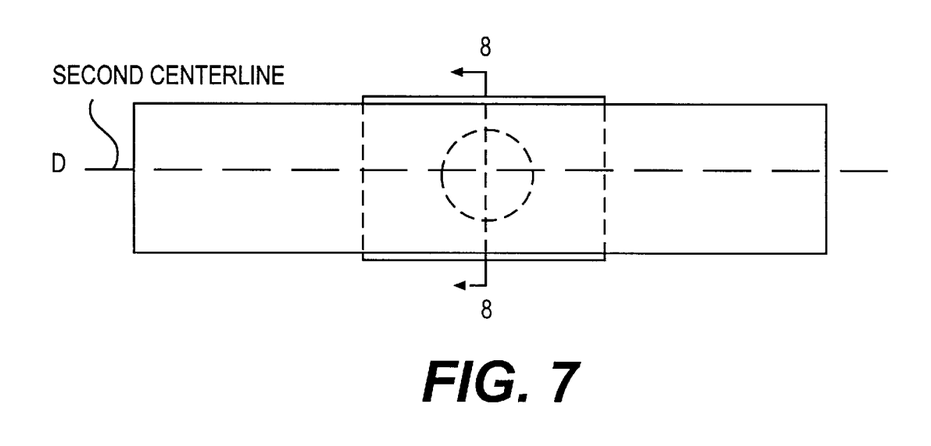
FIG. 7 is a top view of the preferred embodiment of the invention after first and second full-width stacks have been constructed.
Figure 8:
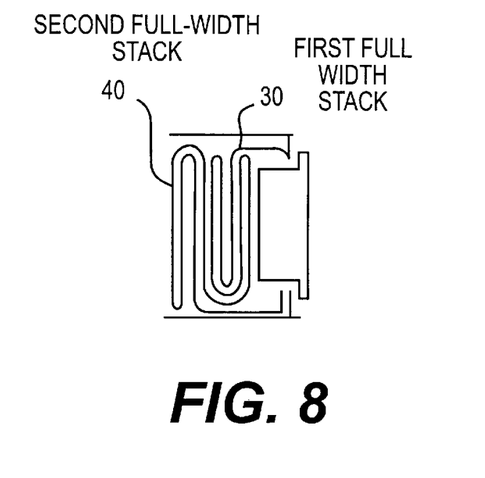
FIG. 8 is a cross-sectional view of the preferred embodiment of the invention after first and second full-width stacks have been constructed.

As embodied herein and depicted in FIGS. 7 and 8, the preferred embodiment of the present invention further includes a second full-width stack of folded cushion material 40. Second full-width stack 40 is defined by one or more fan folds in the bottom half 16 of cushion 10 wherein the folds are substantially centered above the second center line D, substantially over inflator port 20, and first full-width stack 30 is located between second full-width stack 40 and inflator port 20. The advantage of second full-width stack 40 is to provide additional layers directly above inflator port 20 to provide additional reinforcement to withstand the initial stress and heat from inflation. Preferably, second full-width stack 40 has the same number of layers of cushion material as first full-width stack 30. Again, as with stack 30, the number of layers necessary can be adjusted depending on the weight of the cushion material used.

Figure 9:
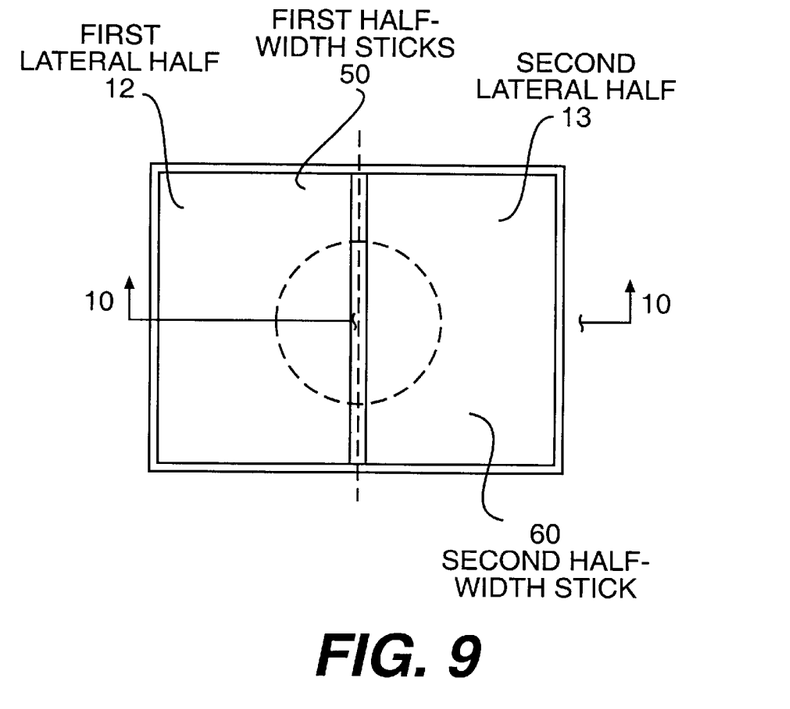
FIG. 9 is a top view of the preferred embodiment of the invention after first and second full-width stacks and first and second half-width stacks have been constructed.
Figure 10:
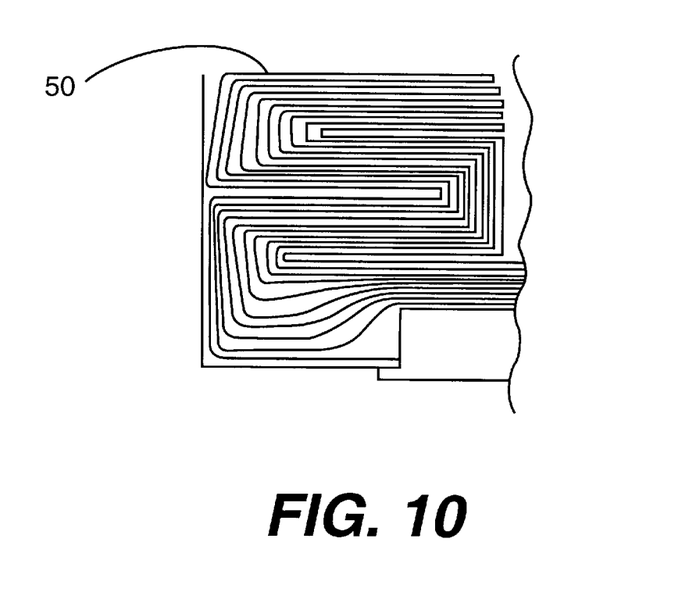
FIG. 10 is a portion of a cross-sectional view of the preferred embodiment of the invention after first and second full-width stacks and first and second half-width stacks have been constructed.

As embodied herein and depicted in FIGS. 9 and 10, the preferred embodiment of the invention further includes a first half-width stack of folded cushion material 50. For the preferred embodiment, first half-width stack 50 is defined by a plurality of fan folds in first lateral half 12 of cushion 10 wherein neither edge of each fold extends substantially over the first center line C. The preferred embodiment of the invention further includes a second half-width stack 60 of folded cushion material. In the preferred embodiment, stack 60 is defined by a plurality of fan folds in the second lateral half 13 wherein neither edge of each fold extends substantially over first center line C and first half-width stack 50 and second half-width stack 60 are adjacent.

An advantage of half-width stacks 50, 60 is that they reduce the amount of friction placed upon full-width stacks 30, 40 during inflation because the half-width stacks will be pushed radially to the side upon inflation. With the early removal of the inertia of the half-width stacks, less friction results between the full-width layers as they unfold. In turn, there is less stress on the cushion material. In addition, when the inflation protective device is used in a module using a center split module cover, first and second half-width stacks 50, 60 have the advantage of being radially inflated because the initial inflation forces push the half-width stacks to each side rather than directly away from the inflator.

Preferably, the folds of first and second half-width stacks 50, 60 extend close to first center line C, but do not extend over that line to the extent that the folds from stack 50 would overlap folds from stack 60. This arrangement is preferred for more compact storage and to avoid added friction that would occur between overlapping half-width stacks during inflation.

As shown in FIG. 6, the above-described inflatable protective device can be placed in or folded directly into a module 21 which can have an inflator 22 mounted at or near inflator port 20.

In an alternative embodiment of the invention, an inflatable protective device using a cushion made of lightweight material comprises a cushion 10 and an inflator port 20 as defined above but includes an alternative stacking configuration.

Figure 11:
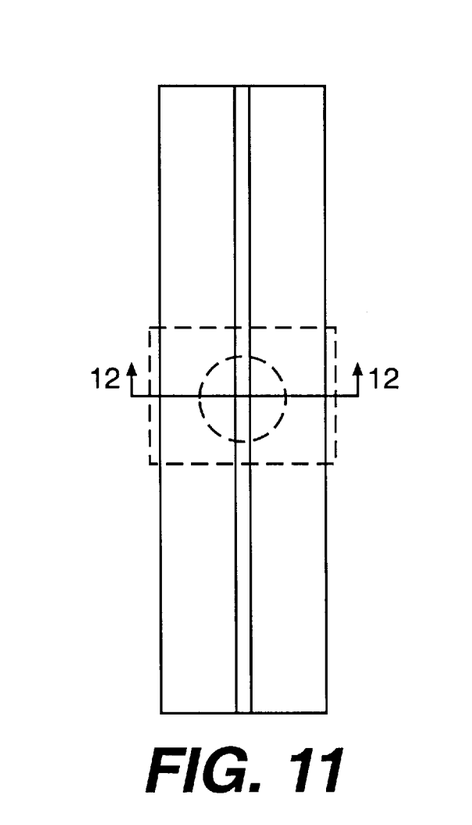
FIG. 11 is a top view of an alternative embodiment of the invention after first and second half-width stacks have been constructed.
Figure 12:
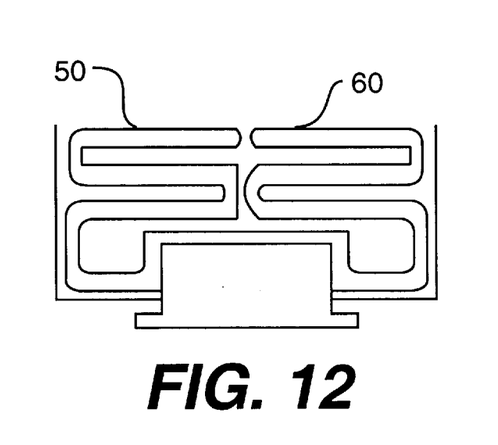
FIG. 12 is a cross-sectional view of the alternative embodiment of the invention after first and second lateral half stacks have been constructed.

As embodied herein and depicted in FIGS. 11 and 12, the embodiment includes a first half-width stack 50. For this embodiment, stack 50 is defined by a plurality of fan folds in first lateral half 12 wherein neither edge of each fold extends substantially over first center line C. Additionally, the alternative embodiment includes a second half-width stack 60 defined by a plurality of fan folds in second lateral half 13 wherein neither edge of each fold extends substantially over first center line C.

Figure 13:
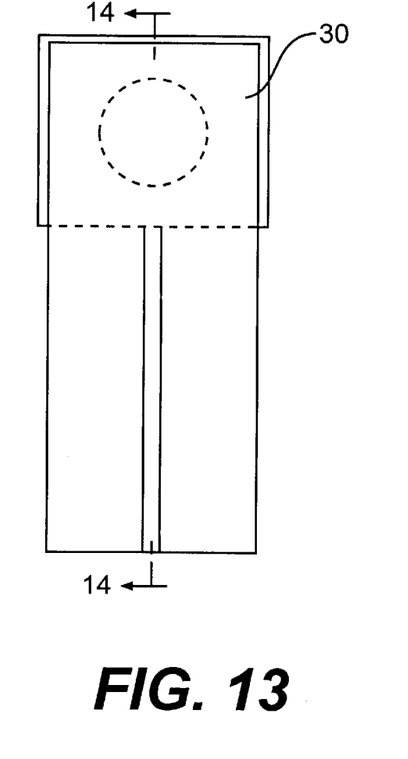
FIG. 13 is a top view of the alternative embodiment of the invention after first and second half-width stacks and a first full-width stack have been constructed.
Figure 14:
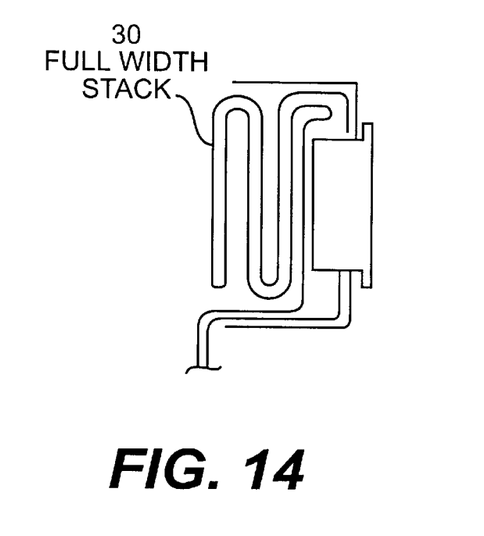
FIG. 14 is a cross-sectional view of the alternative embodiment of the invention after first and second half-width stacks and a first full-width stack has been constructed.

As embodied herein and depicted in FIGS. 13 and 14, the alternative embodiment further includes a first full-width stack 30. For the alternative embodiment, stack 30 is defined by a plurality of fan folds in top 17 wherein the folds are substantially centered above second center line D and are substantially over inflator port 20.

Figure 15:
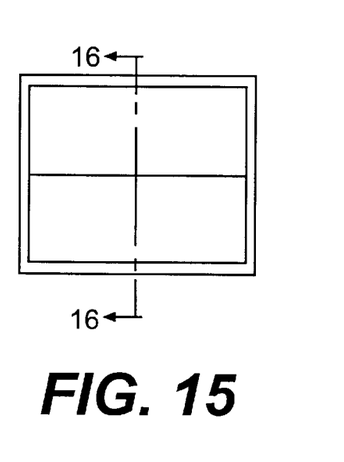
FIG. 15 is a top view of the alternative embodiment of the invention after first and second half-width stacks, first full-width stack, and a third half-width stack have been constructed.
Figure 16:
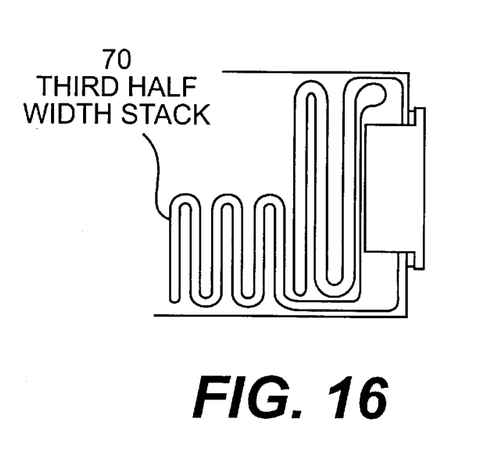
FIG. 16 is a cross-sectional view of the alternative embodiment of the invention after first and second half-width stacks, first full-width stack, and third half-width stack have been constructed.

As embodied herein and depicted in FIGS. 15 and 16, the alternative embodiment further includes a third half-width stack 70. Stack 70 is defined by a plurality of fan folds in bottom 16 wherein neither edge of each fold extends substantially over second center line D. The advantage of third half-width stack 70 is that it can be located closest to the edge of an edge-opening module cover so that stack 70 will radially inflate. As a half-width stack, stack 70 can begin to exit the module even when the module cover just begun to open. The advantage of this stacking configuration is most apparent when an inflatable protective device is used in a module using an edge-opening module cover (e.g. "six o'clock" tear seam). Because that type of module cover takes longer to rotate out of the way than a center tear seam module door, cushion material is not ejected from the module as quickly. Accordingly, frictional forces occur in the full-width stacks more readily. Such friction can contribute to cushion failure near the inflation port. Therefore, by placing half-width stacks closer to the inflator port, but away from the hinge edge of the cover, these stacks unfold sooner because they exit the module earlier with less frictional forces developing between the full-width layers. Accordingly, this configuration enhances early radial inflation.

Another alternative embodiment eliminates third half-width stack 70 in favor of a second full-width fold in the bottom 16. This embodiment would be advantageous for use with a center-tear seam module cover where stack 70 would provide no advantage and would result in non-symmetric inflation of the cushion.

In another alternative embodiment of the invention, an inflatable protective device using a cushion made of lightweight material comprises a cushion 10 an inflator port 20 as defined above but includes an alternative stacking configuration.

Figure 17:
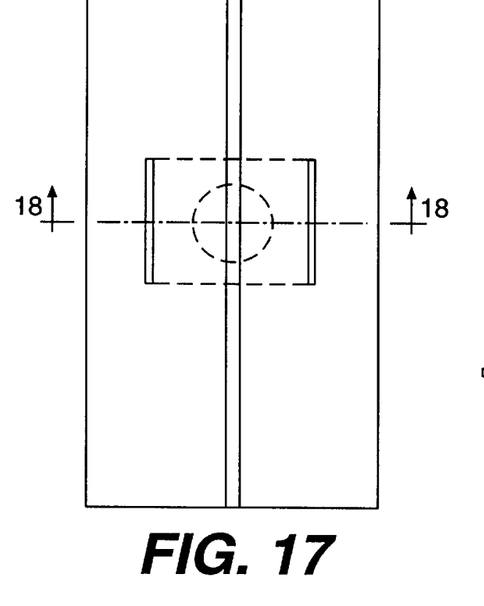
FIG. 17 is a top view of a second alternative embodiment of the invention after first and second half-widths stacks and first and second full-width stacks have been constructed.
Figure 18:
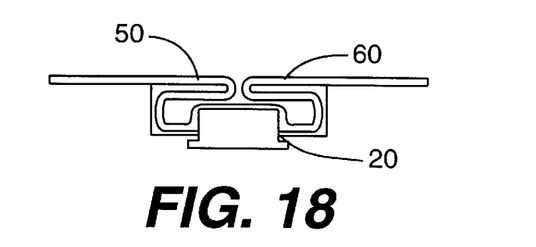
FIG. 18 is a cross-sectional view of the second alternative embodiment of the invention after the first and second half-width stacks have been constructed.
Figure 18A:
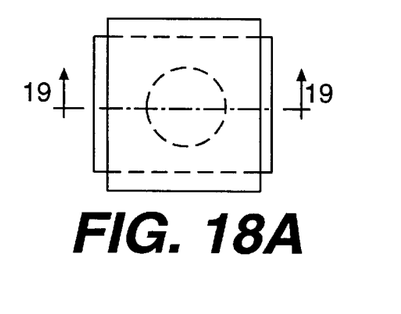

As embodied herein and depicted in FIGS. 17 and 18, the embodiment includes a first half-width stack 50. For this embodiment, stack 50 is defined by a plurality of fan folds in first lateral half 12 wherein neither edge of each fold extends substantially over first center line C. Additionally, the alternative embodiment includes a second half-width stack 60 defined by a plurality of fan folds in second lateral half 13 wherein neither edge of each fold extends substantially over first center line C.

Figure 19:
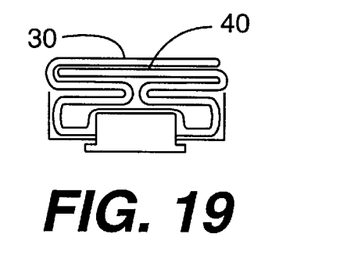
FIG. 19 is a cross-sectional view of the second alternative embodiment of the invention after first and second half-width stacks and first and second full-width stacks have been constructed.

As embodied herein and depicted in FIG. 19, the alternative embodiment further includes first and second full-width stacks 30, 40. For the alternative embodiment, stack 30 is defined by one or more fan folds in first lateral half 12 wherein the folds are substantially centered above first center line C and are substantially over inflator port 20 and first and second half-width stacks 50, 60 are located between first full-width stack 30 and inflator port 20. Stack 40 is defined by one or more fan folds in second lateral half 13 wherein the folds are substantially centered above first center line C and are substantially over inflator port 20 and first and second half-width stacks 50, 60 are located between second full-width stack 40 and inflator port 20.

Figure 20:
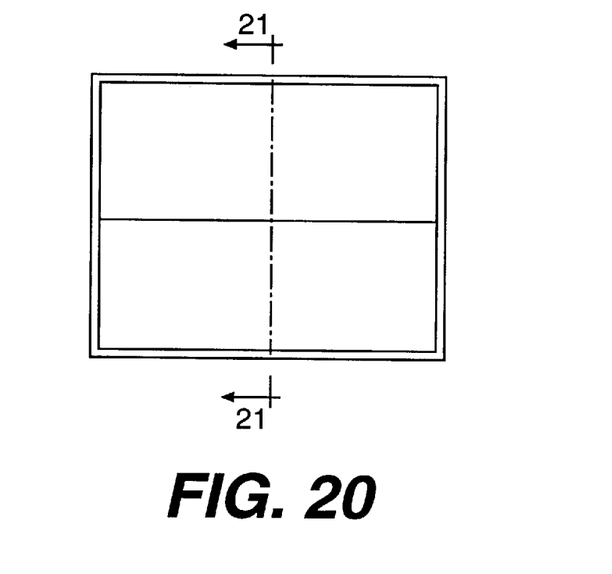
FIG. 20 is a top view of the second alternative embodiment of the invention after first and second half-width stacks, first and second full-width stacks, and third and fourth half-width stacks have been constructed.
Figure 21:
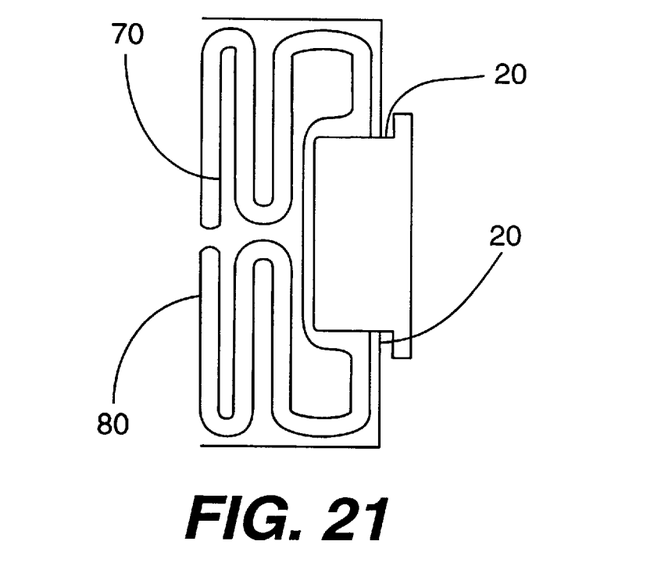
FIG. 21 is a cross-sectional view of the second alternative embodiment of the invention after first and second half-width stacks, first and second full-width stacks and third and fourth half-width stacks have been constructed.

As embodied herein and depicted in FIGS. 20 and 21, the alternative embodiment may further include third and fourth half-width stacks 70, 80. Stack 70 is defined by a plurality of fan folds in top 17 wherein neither edge of each fold extends substantially over second center line D. Stack 80 is defined by a plurality of fan folds in bottom 16 wherein neither edge of each fold extends substantially over second center line D. The alternative embodiment has the advantage of providing a symmetrical configuration that is better suited for a center-split module cover and which places the full-width folds further away from the inflator where they will unfold earlier during inflation. By having the full-width folds closer to the module cover, less friction occurs between the material closer to the inflator port minimizing stress causing cushion failure near the inflator port.

In other embodiments, the cushion material is a woven fabric with 300 or less denier yarn or 210 or less denier yarn. More preferably, the woven fabric includes 100 or less denier yarn. These materials have the advantage of providing lightweight material for a more compact inflatable protective device yet sufficient strength to withstand the initial inflation stress and heat. Costs and the application for which the device will be used may dictate what material is used. Some cushion materials that are made of lightweight fabrics are provided in U.S. Pat. No. 5,482,317, which is incorporated herein by reference as though set forth in full.

Following the above detailed description of the present invention concerning inflatable protective devices, the present invention concerning methods for making an inflatable protective device can easily be discerned by those of ordinary skill in the pertinent art. In accordance with the invention, the present invention for a method for making an inflatable protective device includes the steps of constructing a first full-width stack, constructing a second full-width stack, constructing a first half-width stack, and constructing a second half-width stack as described above.

An alternative method for making an inflatable protective device includes the steps of constructing a first half-width stack, constructing a second half-width stack, constructing a first full-width stack, and constructing a third half-width stack as described above.

A second alternative method for making an inflatable protective device includes the steps of constructing a first half-width stack, constructing a second half-width stack, constructing a first full-width stack, constructing a second full-width stack, and may further include constructing a third half-width stack, and constructing a fourth half-width stack as described above.

It is contemplated that various modifications and variations can be made to the order of the steps to the invented method. For example, in the alternative method of making an inflatable protective device, the steps of constructing a first half-width stack can be made after constructing a second half-width stack.

EXAMPLES

The invention will be further clarified by the following examples, which are intended to be exemplary of the invention.

Example 1

A fabric was constructed of a warp of 45 denier high tenacity nylon yarn and a filling of 100 denier high tenacity nylon yarn. The fabric properties can be found in Table 1 of U.S. Pat. No. 5,482,317 for fabric style 64144. A square-shaped inflatable protective cushion was folded as shown in FIGS. 4–10. The first and second full-width stacks each included three (3) folds (seven (7) layers of cushion material for each stack). The first and second half-width stacks included four (4) folds each (nine (9) layers of material for each stack). The inflatable protective device was placed in a module with a center-split opening module cover. The device was then subjected to an inflation test using a standard airbag inflator. The bag inflated and did not fail.

Example 2

A fabric was constructed as in Example 1. A square-shaped inflatable protective cushion was folded with full-width fan folds for the entire cushion. The device was placed in a module and was subjected to an inflation test using a standard airbag inflator. The bag failed before full inflation.

Example 3

A fabric was constructed as in Example 1. A square-shaped inflatable protective cushion was folded as shown in FIGS. 10–16. The first and second half-width stacks had four (4) folds each (nine (9) layers of cushion material for each stack). The full-width stack had two (2) folds (twenty-nine (29) layers of cushion material) and the third half-width stack had four (4) folds (forty-nine (49) layers of cushion material). The device was put in a module with an edge opening cover and was subjected to an inflation test using a standard airbag inflator. The bag inflated and survived except for two small holes on the back left face caused by a discontinuous module tray edge.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An inflatable protective device using a cushion made of lightweight material comprising:

a cushion defined by a first lateral half and a second lateral half divided by a first center line and further defined by a bottom half and top half divided by a second center line;

an inflator port in the cushion centered on the first center line;

a first half-width stack defined by a plurality of fan folds in the first lateral half wherein neither edge of each fold extends substantially over the first center line;

a second half-width stack defined by a plurality of fan folds in the second lateral half wherein neither edge of each fold extends substantially over the first center line;

a first full-width stack defined by one or more fan folds in the top half wherein the folds are substantially centered above the second center line and are substantially over the inflator port; and a third half-width stack defined by a plurality of fan folds in the bottom half wherein neither edge of each fold extends substantially over the second center line and the first full-width stack is located between the third half-width stack and the inflator port.

2. An inflatable protective device as defined in claim 1, wherein said first full-width stack comprises a minimum of five (5) layers of cushion material.

3. An inflatable protective device as defined in claim 1, wherein said third half-width stack comprises a minimum of nine (9) layers of cushion material.

4. An inflatable protective device as defined in claim 2, wherein said cushion is made of material comprising 300 or less denier yarn.

5. An inflatable protective device as defined in claim 4, wherein said cushion is made of material comprising 100 or less denier yarn.

6. An inflatable protective device using a cushion made of lightweight material comprising:

a cushion defined by a first lateral half and a second lateral half divided by a first center line and further defined by a bottom half and top half divided by a second center line;

an inflator port in the cushion centered on the first center line;

a first half-width stack defined by a plurality of fan folds in the first lateral half wherein neither edge of each fold extends substantially over the first center line;

a second half-width stack defined by a plurality of fan folds in the second lateral half wherein neither edge of each fold extends substantially over the first center line;

a first full-width stack defined by a plurality of fan folds in the first lateral half wherein the folds are substantially centered above the first center line and are substantially over the inflator port and the first and second half-width stacks are located between the first full-width stack and the inflator port;

a second full-width stack defined by a plurality of fan folds in the second lateral half wherein the folds are substantially centered above the first center line and are substantially over the inflator port and the first and second half-width stacks and first full-width stack are located between the second full-width stack and the inflator port;

a third half-width stack defined by a plurality of fan folds in the bottom wherein neither edge of each fold extends substantially over the second center line; and a fourth half-width stack defined by a plurality of fan folds in the top wherein neither edge of each fold extends substantially over the second center line.

7. A method for making an inflatable protective device, including a cushion made of lightweight material defined by a first lateral half and a second lateral half divided by a first center line and further defined by a bottom half and top half divided by a second center line and including an inflator port in the cushion centered on the first center line, comprising the steps of:

constructing a first half-width stack including a plurality of fan folds in the first lateral half wherein neither edge of each fold extends substantially over the first center line;

constructing a second half-width stack including a plurality of fan folds in the second lateral half wherein neither edge of each fold extends substantially over the first center line;

constructing a first full-width stack defined by a plurality of fan folds in the top half wherein the folds are substantially centered above the second center line and are substantially over the inflator port; and constructing a third half-width stack defined by a plurality of fan folds in the bottom half wherein neither edge of each fold extends substantially over the second center line.

8. A method for making an inflatable protective device as defined by claim 7, the step of constructing the first full-width stack includes making the stack include a minimum of five (5) layers of cushion material.

9. A method for making an inflatable protective device, including a cushion made of lightweight material defined by a first lateral half and a second lateral half divided by a first center line and further defined by a bottom half and top half divided by a second center line and including an inflator port in the cushion centered on the first center line, comprising the steps of:

constructing a first half-width stack including one or more of fan folds in the first lateral half wherein neither edge of each fold extends substantially over the first center line;

constructing a second half-width stack including one or more of fan folds in the second lateral half wherein neither edge of each fold extends substantially over the first center line;

constructing a first full-width stack defined by one or more fan folds in the first lateral half wherein the folds are substantially centered above the first center line and are substantially over the inflator port and the first and second half-width stacks are located between the first full-width stack and the inflator port;

constructing a second full-width stack defined by one or more fan folds in the second lateral half wherein the folds are substantially centered above the first center line and are substantially over the inflator port and the first and second half-width stacks and first full-width stack are located between the second full-width stack and the inflator port;

constructing a third half-width stack defined by a plurality of fan folds in the top wherein neither edge of each fold extends substantially over the second center line; and constructing a fourth half-width stack defined by a plurality of fan folds in the bottom wherein neither edge of each fold extends substantially over the second center line.

* * * * *